(12) United States Patent
Cayeux

(10) Patent No.: US 9,306,859 B2
(45) Date of Patent: Apr. 5, 2016

(54) ESTABLISHING THE PACKET FLOW POSSESSING A SYMMETRICAL QUALITY OF SERVICE BY NEGOTIATING THE QUALITY INDICATOR

(75) Inventor: Christian Cayeux, Illkirch (FR)

(73) Assignee: Alcatel Lucent, Boulogne-Billancourt (FR)

( * ) Notice: Subject to any disclaimer, the term of this patent is extended or adjusted under 35 U.S.C. 154(b) by 169 days.

(21) Appl. No.: 13/813,826

(22) PCT Filed: Jul. 5, 2011

(86) PCT No.: PCT/FR2011/051589
§ 371 (c)(1),
(2), (4) Date: Feb. 21, 2013

(87) PCT Pub. No.: WO2012/022867
PCT Pub. Date: Feb. 23, 2012

(65) Prior Publication Data
US 2013/0163423 A1     Jun. 27, 2013

(30) Foreign Application Priority Data
Aug. 20, 2010 (FR) .................................. 10 56685

(51) Int. Cl.
*H04L 12/28* (2006.01)
*H04L 12/851* (2013.01)
*H04L 12/801* (2013.01)
*H04L 29/06* (2006.01)
*H04J 1/16* (2006.01)

(52) U.S. Cl.
CPC ............ *H04L 47/2441* (2013.01); *H04L 47/10* (2013.01); *H04L 47/2408* (2013.01); *H04L 47/2433* (2013.01); *H04L 65/80* (2013.01)

(58) Field of Classification Search
USPC ........................................ 370/252, 389, 282
See application file for complete search history.

(56) References Cited

U.S. PATENT DOCUMENTS

| | | | |
|---|---|---|---|
| 6,980,523 B1 * | 12/2005 | Lipford et al. ................. | 370/252 |
| 7,050,396 B1 * | 5/2006 | Cohen et al. ................... | 370/235 |
| 7,352,770 B1 * | 4/2008 | Yonge, III ................ | H04B 3/54 |
| | | | 370/445 |
| 2002/0165966 A1 * | 11/2002 | Widegren et al. ............. | 709/226 |
| 2005/0238026 A1 * | 10/2005 | Wu et al. ..................... | 370/395.2 |
| 2008/0247314 A1 | 10/2008 | Kim et al. | |
| 2008/0317045 A1 | 12/2008 | Chen | |

OTHER PUBLICATIONS

Nichols et al., "RFC 2474—Definition of the Differentiated Services Field (DS Field)", Dec. 1, 1998, Internet Engineering Task Force, RFC 2474.*
Nichols K et al., "RFC 2474—Definition of the Differentiated Services Field (DS Field)", Dec. 1, 1998, XP002139607.

(Continued)

*Primary Examiner* — John Pezzlo
(74) *Attorney, Agent, or Firm* — Harness, Dickey & Pierce, P.L.C.

(57) ABSTRACT

A method for establishing a packet flow with another device over a communication network includes determining a first value of a priority indicator based on the type of data flow and exchanging signaling messages with that other device in order to enable the establishment of the data flow. The first value is inserted into the first of those signaling messages. Upon receiving a signaling message having a received value of that priority indicator, a sent value is determined based on that received value, and inserted into the packets of the packet flow.

10 Claims, 1 Drawing Sheet

(56) References Cited

OTHER PUBLICATIONS

The French Search Report for French Application No. 1056685 dated Mar. 28, 2011.

French Written Opinion of Searching Authority FR237.
The International Search Report for International Application No. PCT/FR2011/051589 dated Sep. 19, 2011.
Chinese Office Action No. 2015050800998470 mailed on May 13, 2015.

* cited by examiner

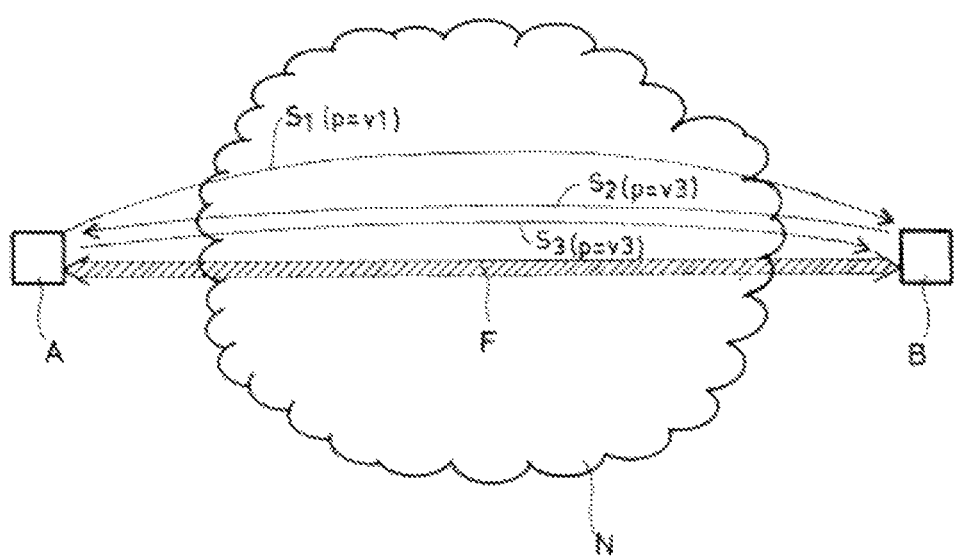

ESTABLISHING THE PACKET FLOW POSSESSING A SYMMETRICAL QUALITY OF SERVICE BY NEGOTIATING THE QUALITY INDICATOR

This invention relates to multimedia communication networks. These networks may transmit traffic of different types (voice, video, data, etc.) corresponding to various applications: telephony, videophony, web browsing, file downloading, real-time text discussions (also known as "instant messaging" or "chatting"), etc.

These sorts of traffic are conventionally transmitted in the form of packet flows, particularly IP packets (for "Internet Protocol"). The same application message may be transmitted in multiple IP packets and must be reconstructed upon receipt before being delivered to the application.

These applications and types of traffic are associated with different quality of service criteria, and, as network transmission capacity is limited, a need arises to give greater priority to some application/traffic pairs than to others.

For example, in a voice call, the delay taken by some packets may cause a loss of voice quality. In the worst-case scenario, the audio message may be inaudible or incomprehensible.

In the case of web browsing, a delay taken by some packets may potentially cause the feeling of a slower system, but most of the time the effect is imperceptible.

It therefore appears natural to give greater importance to voice traffic in comparison to data traffic.

There are technical solutions that make it possible to assign priorities to different data flows transmitted by a network. One of those solutions is the DiffServ mechanism, particularly as described in RFC 2474 of the IETF, "Definition of the Differentiated Services Field (DS Field) in the IPv4 and IPv6 Headers".

The principle of this DiffServ mechanism is to insert a field into a flow's packets, called DS Field, whose value determines a service class (or code point). The network devices (routers, gateways, etc.) located on the packet flow's path must read the DS Field and process the retransmission of the packets based on that value, with the highest service class packets being the top-priority packets.

This way, the flows that require high quality of service may be given preference by the communication network over flows that do not.

However, no mechanism exists that can specify how the service class must be determined. Each device that inserts a service class into a packet flow determines the value based on its own mechanisms and based on the various flows that it may need to manage. These mechanisms may depend on the equipment's supplier.

In the context of bidirectional communication, the results may often be that both of the terminals (or the corresponding access devices) use different policies to determine the service class. The flows of each direction belong to different service classes and therefore, the communication network's behavior with respect to them is different and causes qualities of service that are perceived as different for the two directions.

For example, in the case of a bidirectional voice call, a flow of a device connected to an echo-sensitive network might require a reduced time delay. If this is not applied, the users might suffer from echo problems (the time delay parameter amplifies the perception of an echo).

The purpose of the invention is to remedy this problem by offering a mechanism that guarantees the same perceived quality of service for all directions of a communication session.

To do so, the object of the invention is a network device that comprises means for establishing a packet flow with another device over a communication network, means for determining a first value of a priority indicator based on the type of that data flow, and means for exchanging signaling messages with that other device in order to enable the establishment of the data flow. The inventive device further has means for inserting that first value into the first of the signaling messages and means for, whenever a signaling message (s1, s2) comprising a received value of the priority indicator is received, determining a sent value based on the received value and inserting that sent value into the packets of the packet flow.

A further object of the invention is a method for establishing a packet flow with another device over a communication network, comprising a step of determining a first value of priority indicator based on the type of the data flow and a step of exchanging, with that other device, signaling messages in order to enable the establishment of the data flow. The first value is inserted into the first of those signaling messages. Upon receiving a signaling message comprising a received value of that priority indicator, a sent value is determined based on that received value, and inserted into the packets of the packet flow.

According to one embodiment of the invention, the sent value is the maximum value between the received value and the value determined by the device based on the packet flow type.

The priority indicator may comply with the DiffServ mechanism, and the device may in such a case be adapted to insert the third value into the "DS Field" field of the packet flow.

The sent value may be inserted into an attribute in accordance with the Session Description Protocol (SDP) within the signaling messages.

The sent value may be inserted into a "DS Field" field of the packet flow's packets.

The invention will become more clearly apparent in the following description, with reference to the attached FIGURE. This FIGURE diagrams the messages exchanged between two devices connected by a communication network and implementing the invention.

The implementation of a session on a communication network, particularly on an "Internet" data network, generally comprises two phases: an establishment phase, during which the parties to the session exchange signaling messages, and a communication phase during which the parties exchange data: voice, videos, text, etc.

In the implementation depicted in FIG. 1, two devices A and B are connected via a communication network N. However, the invention is able to apply with more parties, i.e. in the case of audio or video conference calls. The two devices may be communication terminals: fixed-line or mobile telephones, computers, personal digital assistants (or PDAs), etc.

They may also be devices hosted by a service provider, such as servers. For example, the communication may be a communication between a content server and a communication terminal enabling the terminal's user to access audio content, video content, etc. They may also be virtual devices.

In the example in FIG. 1, it is assumed that the device A initiates the creation of the communication session. It sends the device B a first signaling message, S1. That message may typically be an invite message in accordance with the SIP protocol as defined in RFC 3261 of the IETF, "Session Invitation Protocol".

That "Invite" message may be relayed by different apparatuses, such as "SIP Proxies", within the communication network N. Those apparatuses are not depicted in FIG. 1, and will not be described any further, as they do not influence the invention itself.

The device A has means for determining a value of a priority indicator p based on the type of data flow that must make up the communication session. "Type" here refers to the nature of the data to be transmitted: video, audio, audio-video, real-time "messaging" or "chatting" text, etc. The type may also be more specific, and it may be possible to divide a general type such as "video" into multiple types.

The supplier of the device A generally configures a lookup table matching those different types of data flows and a value of the priority indicator.

That priority indicator preferentially complies with the DiffServ mechanism as specified by RFC 2474, "Definition of the Differentiated Services Field (DS Field) in the IPv4 and IPv6 Headers". The device A maybe operative to directly have access to a lookup table matching the data flow type and the "codepoint".

According to the invention, the device has means for inserting that value, v1, into the first signaling message S1, i.e. the invite message. That value may be inserted into an appropriate attribute of the SDP (Session Description Protocol) protocol as defined by RFC 4566 of the IETF.

This attribute may be 8 bits long. It may, for example, be named "Traffic-class".

According to ABNF (Augmented Backus-Naur Form) grammar, this attribute may be of the form:

Traffic-class="a=traffic-class:" Traffic-class-value
Traffic-class-value=*DIGIT

The value that may be taken by this attribute is a whole number between 0 and 255.

In the example in the FIGURE, an SDP may be found within the SIP "Invite" message S1 with the type: a=traffic-class:v1

When the signaling message S1 is received, the device B must read that received value v1 of the priority indicator p.

It also has means for inserting within that signaling message S2 a "sent" value of the priority indicator p. That send value is determined based on the received value v1.

According to one embodiment of the invention, that sent value (v3) is equal to the received value.

According to another embodiment of the invention, that sent value is equal to the greater of the received value v1 and a value determined based on the type of data flow. This because, as with the device A, it has means for determining a value v2 for the priority indicator p associated with the type of data flow. It may determine the type of data flow using other fields and attributes of the signaling message S1. In particular, the attribute "m" of the media's description, SDP, may be used to determine that value v2.

The value inserted into the message S2 is therefore a value v3=max(v1,v2).

And the message S2 comprises an attribute a=traffic-class: v3

When that message S2 is received, the device A may read that attribute and become aware of that value v3.

In some situations, the device A may send a following signaling message back S3. This may be a SIP "ACK" message.

It is not necessary to insert a priority indicator there. However, the invention obviously applies in cases where that indicator is inserted into potential other signaling messages S3.

The devices A and B also have means for establishing the packet flow F over the communication network N, based on terms and parameters negotiated during the signaling messages (CODEC etc.)

They may insert the value of the priority indicator previously determined within those packets, meaning that value v3.

As previously mentioned, that value may comply with DiffServ specifications. It may particularly be 8 bits long, with a 6-bit DSCP field (Differentiated Services CodePoint), as specified in section 3 of RFC 2474 of the IETF.

Thus, the value of the priority indicator may be directly inserted into the "DS Field" field of the outgoing packets.

The insertion of the packets into the DS Field is done in a manner known per se. By contrast, the way in which the inserted value is determined is novel: according to the invention, a device in accordance with the invention must therefore choose, as the DiffServ indicator to use for a packet flow, the value received in the latest received signaling message regarding that flow.

This way, the packet flow has the same DiffServ value in both directions. The transmission of packets is therefore symmetrical, and the quality of service perceived by the two devices A and B is identical.

Although the embodiments described above use the DiffServ mechanism, the invention is not limited to that type of mechanism; rather, it may apply to any protocol that makes it possible to define a priority or quality of service indicator for a data packet.

The invention claimed is:

1. A network device comprising:
   means for establishing a packet flow with another device over a communication network,
   means for determining a first value of a priority indicator based on the type of said packet flow,
   means for exchanging signaling messages with said other device in order to enable the establishment of said packet flow,
   means for inserting said first value into a first of said signaling messages, and
   means for, upon receiving a signaling message comprising a received value of said priority indicator, determining a sent value of the priority indicator based on said received value of the priority indicator and inserting said sent value into the packets of said packet flow,
   wherein the sent value of the priority indicator is equal to the received value of the priority indicator.

2. A network device according to claim 1, wherein said sent value is the greater value between said received value and the value determined by said device based on said type of packet flow.

3. A network device according to claim 1 wherein said priority indicator complies with the DiffServ mechanism, and adapted to insert a third value into the field "DS Field" of said packet flow.

4. A network device according to claim 1, adapted to insert said sent value into an attribute compliant with Session Description Protocol (SDP) within said signaling messages.

5. A network device according to claim 1, adapted to insert said sent value into a "DS Field" field of the packets of said packet flow.

6. A method for establishing a packet flow with another device over a communication network, comprising:
   determining a first value of a priority indicator based on the type of said packet flow, and
   exchanging signaling messages with said other device in order to enable the establishment of said packet flow, wherein said first value of the priority indicator is inserted into the first of said signaling messages, wherein, upon receiving a signaling message comprising a received value of said priority indicator, a sent value of the priority indicator is determined based on said received value of the priority indicator and inserted into the packets of said packet flow, wherein the sent value of the priority indicator is equal to the received value of the priority indicator.

7. A method according to claim 6, wherein said sent value is the greater value between said received value and the value determined by said device based on said type of packet flow.

8. A method according to claim 6 wherein said priority indicator complies with the DiffServ mechanism, and adapted to insert a third value into the field "DS Field" of said packet flow.

9. A method according to claim 6, wherein said sent value is inserted into an attribute compliant with SDP protocol within said signaling messages.

10. A method according to claim 6, wherein said sent value is inserted into a "DS Field" field of the packets of said packet flow.

\* \* \* \* \*